Patented Nov. 28, 1950

2,531,812

UNITED STATES PATENT OFFICE 2,531,812

APPLICATION OF DRILLING FLUIDS

Ernst A. Hauser, Cambridge, Mass.

No Drawing. Application January 16, 1948, Serial No. 2,821

6 Claims. (Cl. 252—8.5)

This invention relates to well-drilling fluids, and more particularly as employed in the drilling of oil and gas wells, by the rotary system of drilling. This application is a continuation-in-part of application Serial No. 473,969, now abandoned, filed January 29, 1943.

In the drilling of wells, particularly oil and gas wells, under the rotary system of drilling, a drilling fluid or mud is employed. This drilling fluid when of the water-base type, is either made up from clays obtainable at the well or by the employment of various hydrophilic colloids as described in the Harth Patent No. 1,991,637. These colloids, of which bentonite is the most important one, hydrate in water, so as to form the drilling fluid.

In the drilling of oil wells, oil-base drilling fluids are also employed in which the external or continuous phase is oil instead of water. Such oil base drilling fluids are useful in "drilling in," that is, where the drilling is into the oil- or gas-bearing stratum, because oil will not "drown out" oil or gas as is the case with water. It is also advantageous to employ such oil-base drilling fluids in drilling through shaley formations, which are subject to hydration by water. It is also useful for employment in taking cores. The external phase of the drilling fluid is any suitable oil such as petroleum crude oil, distillate or residue, or a coal tar distillate or residue; oils which are generally employed are kerosene, fuel oil and Diesel oil. However, oil base drilling fluids are not entirely satisfactory, because of a limitation of the character of the solid material heretofore employed.

One of the objects of this invention, therefore, is to provide a well-drilling fluid and a process of drilling wells in which the external phase of the fluid is an oil, which has improved properties, characteristics, and modes of operation.

Further objects will appear from the detail description in which will be set forth a number of embodiments of this invention. It is to be understood, however, that this invention is susceptible of various embodiments, and that certain features and subcombinations are of utility and may be employed without reference to other features and subcombinations, within the scope of the appended claims.

Generally stated, and in accordance with an illustrative embodiment of this invention, there is employed a material which comprises a cation modified clay which forms a gel in an organic liquid such as the oil employed, and has a substantial gel characteristic therein. The modified clay is one in which the gel characteristic is exemplified by the fact that two grams of the modified clay swell to at least 12 milliliters in a liquid such as nitrobenzene. In accordance with an illustrative embodiment, the modified clay is one originally exhibiting a substantial base exchange capacity, but in which the cation has been replaced by a substituted cation of the class of onium bases consisting of ammonium, phosphonium, sulfonium, arsonium, stibonium, oxonium and telluronium bases.

The clays which are useful as starting materials in accordance with this invention are those exhibiting substantial base-exchange properties, and particularly those exhibiting comparatively high base-exchange properties and containing cations capable of more or less easy replacement. The clays particularly contemplated by the specification and the claims, include the montmorillonites, viz., sodium, potassium, lithium, and other bentonites, viz., Wyoming bentonite, magnesium bentonite (sometimes called hectorite) and saponite; also nontronite, attapulgite, illite, zeolites, and fuller's earths, particularly those of the Georgia-Florida type. The base-exchange capacities of the various clays enumerated run from about 15 to about 100, based upon milliequivalents of exchangeable base per 100 grams of clay. More specifically, and in accordance with illustrative embodiments of this invention, a clay of the character described and exhibiting substantial base-exchange capacity, is reacted with an organic compound, more particularly one hereinafter generally defined and referred to as an "onium" compound, by substitution of the clay cation of the organic compound, which cation is of a class hereinafter referred to as an "onium" base; see Hackh's Chemical Dictionary, second edition. This invention is not, however, restricted to the use of a reaction product of a base-salt with clay-salt, but includes the reaction product of a free base with an acid-clay.

A number of the compounds capable of reacting with clays, particularly bentonite, will be described; it is to be understood, however, that various other compounds reactable with clays of the character described, may be employed.

The unmodified clay such as untreated sodium bentonite in contact with water absorbs large quantities of water, and swells, forming a hydrogel. When such a clay is treated with an onium compound, it will cease to swell in water, but will swell in many organic liquids, and will form stable gels and colloidal dispersion. Such swelling characteristic may be determined by introducing 2 grams of the onium-bentonite product in 100 milliliters of nitrobenzene and noting the amount of swelling in cubic centimeters. Thus in the case of amine-bentonite products the employment of salts of aliphatic amines, including the propyl, butyl and octylamines containing from 3 to 8 carbon atoms will not produce an amine-bentonite product showing a swelling of from 5 to 7 ml. in 100 ml. of nitrobenzene. There is, however, generally a distinct region of increase of swelling with amine-bentonites in which the amine has in excess of 10 carbon atoms. Thus the swelling in 100 ml. of nitrobenzene of corresponding amine-bentonites are found to be: decylamine-bentonite (10 carbon atoms)—36 ml.; dodecylamine-bentonite (12 carbon atoms)—50 ml.; with this high swelling holding through the series, viz., octadecadienyl-amine-bentonite (18 carbon atoms)—50 ml., a like relation will generally be found for other onium-bentonites. Such products may, therefore, well be called "high-swelling" onium-bentonites.

The ratio of the onium compound, such as, for example, an amine compound to bentonite, may be varied within certain limits in converting the bentonite to the organophilic condition. In general, it is satisfactory to react the amine salt with the bentonite in the ratio of 100 milliequivalents of amine salt to 100 grams of bentonite, which is approximately the base-exchange capacity of the standard highly swelling sodium bentonites. Typical values of swelling on the above basis are listed below for a series of dodecylammonium-bentonites, in which the ratio of amine to bentonite was varied over wide limits:

| Amine/bentonite: | 50 me./100 g. | 75 | 100 | 125 | 150 | 200 | 300 |
|---|---|---|---|---|---|---|---|
| Swelling in nitrobenzene; ml. | 27.3 | 43.0 | 65.3 | 47.5 | 30.0 | 20.5 | 15.5 |

This table indicates the wide range over which the amine-bentonite ratio can be varied, but it also shows the optimum effect exhibited at the theoretical base-exchange value for this combination.

For the most efficient use of organic base to obtain optimum gelling properties, it is therefore desirable either to select an onium compound such as an amine compound, which, when converted to the onium base form and reacted by base-exchange with the clay, are absorbed to certain points on the surface of the mineral, or to substitute the proper aliphatic chain in a polyammonium base.

The type of clay mineral to be used may vary with the intended use. For optimum gelling properties it is best to use a bentonite which exhibits good gelling properties in water. However, some non-swelling clays when converted to the onium salt form will swell in organic liquids and give rise to thixotropic colloidal dispersions.

It is to be understood that when reference is made to basic organic onium compounds such as amines, it is implied that before reacting with the clay by base-exchange, the amine is converted to the onium form either by the addition of acid or by reason of the fact that some part of the inorganic base in the naturally occurring clay consists of hydrogen.

Various examples of modified clays embodying this invention will now be described, and, while in these examples the clay chosen is bentonite because of its comparatively high base-exchange capacity, it will be understood that the invention is applicable to onium-clay reaction products in which the clay is other than bentonite.

*Example I*

2750 g. of a Wyoming bentonite was dispersed in 70 liters of water and the slurry allowed to stand for two hours to settle out the non-clay impurities. About 10% of the weight of the bentonite was discarded in this process. 150 g. (2.5 mol) of glacial acetic acid was added to 663 g. (2.5 mol) of octadecadienylamine and the amine salt then dissolved in 4 liters of warm water. Flocculation of the bentonite occurred upon addition of the amine salt solution, and the flocculent precipitate was filtered, washed, dried, and pulverized. The resulting bentonite compound thus obtained may be dispersed in various organic liquids to form gels.

*Example II*

2750 g. of a Wyoming bentonite was dispersed in 70 liters of water and the slurry allowed to stand for two hours to settle out the non-clay impurities. 150 g. (2.5 mol) of glacial acetic acid was added to 464 g. (2.5 mol) of dodecylamine and the amine salt then dissolved in 4 liters of warm water. Flocculation of the bentonite occurred upon addition of the amine salt solution, and the precipitate was filtered, washed, dried and pulverized.

*Example III*

Triphenyl-lauryl phosphonium bromide was prepared by refluxing a mixture of equivalent weights of triphenyl-phosphine and lauryl bromide. After six hours the reaction mixture was cooled and dissolved in alcohol. To a dispersion of 50 g. of Wyoming bentonite in one liter of water was added an alcohol solution of 0.05 mol of the phosphonium base. Upon bringing the pH of the slightly basic dispersion to about 4 with dilute hydrochloric acid, the bentonite complex flocculated, was filtered, washed, dried and ground.

*Example IV*

One-tenth mol of didodecyl ethyl sulfonium bromide is dispersed in one liter of water, and this is then mixed with agitation with 400 c. c. of a 2½% suspension of Wyoming bentonite. After one hour's standing, it is filtered, dried and ground. The resulting bentonite compound thus obtained may be dispersed in various organic liquids.

*Example V*

The process of Example IV is carried out except that one-tenth mol of decyl-triphenylarsonium halide is used instead of didodecyl ethyl sulfonium bromide.

*Example VI*

The process of Example IV is carried out except that one-tenth mol of decyl-triphenylstibonium halide is used instead of didodecyl ethyl sulfonium bromide.

Example VII

The process of Example IV is carried out except that one-tenth mol of didodecyl-gamma-pyrone is used instead of didodecyl ethyl sulfonium bromide.

Example VIII

The process of Example IV is carried out except that one-tenth mol of didodecyl ethyltelluronium chloride is used instead of didodecyl ethyl sulfonium bromide.

Each of the above-described modified clay products forms a gel in an organic liquid and has a substantial gel-forming characteristic therein in the manner heretofore defined. In all of these the onium base has at least ten carbon atoms.

A material prepared as heretofore described will gel in oil, and 1 to 4% will produce a drilling fluid having the required viscosity and thixotropic properties. Such a fluid may be prepared, using such proportions of the material as may be necessary to secure the desired properties. During the course of drilling, however, the material is added so as to maintain and control those properties. Not only will the resultant drilling fluid have viscosity characteristics, but it will have thixotropic characteristics; both of which are desired, and even required, in a drilling fluid. All of this is accomplished in an oil phase, as distinguished from a water phase.

Having thus described the invention, what is claimed is:

1. An oil-base well-drilling fluid containing a modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases, and which forms a gel in the oil phase of the fluid and has a substantial gel characteristic therein to the extent that 2 grams of which modified clay swell to at least 12 milliliters in nitrobenzene.

2. An oil-base well-drilling fluid containing a modified clay, originally exhibiting a substantial base-exchange capacity, in which the clay cation has been replaced by a substituted cation of the class of onium bases consisting of ammonium, phosphonium, sulfonium, arsonium, stibonium, oxonium and telluronium bases, and in which the onium base has at least ten carbon atoms.

3. An oil-base well-drilling fluid containing a modified clay, originally exhibiting a substantial base-exchange capacity, in which the clay cation has been replaced by a substituted onium ammonium base which forms a gel in the oil phase of the fluid and has a substantial gel characteristic therein to the extent that 2 grams of which modified clay swell to at least 12 milliliters in nitrobenzene.

4. An oil-base well-drilling fluid containing a modified clay, originally exhibiting a substantial base-exchange capacity, in which the clay cation has been replaced by a substituted onium ammonium base which has at least ten carbon atoms.

5. An oil-base well-drilling fluid containing a modified montmorillonite in which the replaceable cation of the clay mineral has been replaced by a substituted cation of the class of onium bases consisting of ammonium, phosphonium, sulfonium, arsonium, stibonium, oxonium and telluronium bases, which forms a gel in the oil phase of the fluid and has a substantial gel characteristic therein to the extent that 2 grams of which modified clay swells to at least 12 milliliters in nitrobenzene.

6. An oil-base well-drilling fluid containing a modified montmorillonite in which the replaceable cation of the clay mineral has been replaced by a substituted cation of the class of onium bases consisting of ammonium, phosphonium, sulfonium, arsonium, stibonium, oxonium and telluronium bases, and in which the onium base has at least ten carbon atoms.

ERNST A. HAUSER.

REFERENCES CITED

The following references are of record in the file of this patent:

UNITED STATES PATENTS

| Number | Name | Date |
| --- | --- | --- |
| 1,991,637 | Harth | Feb. 19, 1935 |
| 2,033,856 | Smith | Mar. 11, 1936 |
| 2,055,666 | Moore et al. | Sept. 29, 1936 |
| 2,217,926 | Van Campen | Oct. 15, 1940 |
| 2,259,875 | Bent et al. | Oct. 21, 1941 |
| 2,248,636 | Marsden | July 8, 1941 |
| 2,360,544 | Bond | Oct. 17, 1944 |